United States Patent [19]

Frenzel et al.

[11] Patent Number: 5,729,057
[45] Date of Patent: Mar. 17, 1998

[54] VEHICLE ANTITHEFT DEVICE USING TRANSPONDER AND HAVING ILLUMINATED KEYHOLE

[75] Inventors: Henryk Frenzel, Regensburg; Helmut Kraus, Altertheim, both of Germany

[73] Assignee: Siemens Aktiengesellschaft, Munich, Germany

[21] Appl. No.: 690,070

[22] Filed: Jul. 31, 1996

[30] Foreign Application Priority Data

Jul. 31, 1995 [DE] Germany ............ 195 28 093.8

[51] Int. Cl.[6] .................................................. B60R 25/00
[52] U.S. Cl. .................. 307/10.3; 180/287; 307/10.8; 362/100
[58] Field of Search .................. 307/9.1–10.6, 307/10.8; 180/287; 315/77; 70/454; 340/425.5, 426, 825.3–825.32, 825.69, 825.72; 362/83.3, 61, 802, 116, 80, 100

[56] References Cited

U.S. PATENT DOCUMENTS 4,234,909  11/1980  Cotroneo ............................ 362/100
5,043,593  8/1991  Tsutsumi et al. .................... 307/10.2
5,532,522  7/1996  Dietz et al. ......................... 307/10.5
5,597,227  1/1997  Bergen et al. ...................... 362/100

FOREIGN PATENT DOCUMENTS 93 14 256  9/1993  Germany .

OTHER PUBLICATIONS

Betriebsanleitung Mazda 323, 1987, pp. 2–3 and 3–3; Mazda 323 Manual.

*Primary Examiner*—Richard T. Elms
*Attorney, Agent, or Firm*—Herbert L. Lerner; Laurence A. Greenberg

[57] ABSTRACT

An anti-theft device for a motor vehicle includes a key having a transponder. A lock has a keyhole for receiving the key. An antenna is in the vicinity of the lock. A control unit for controlling the antenna sends starting signals to the transponder and receives answer signals from the transponder. An assembly is turned on or off if the answer signals correspond to set-point signals. The antenna has a lighting device being controlled by the control unit for illuminating a region around the keyhole, at least before the key is inserted.

8 Claims, 2 Drawing Sheets

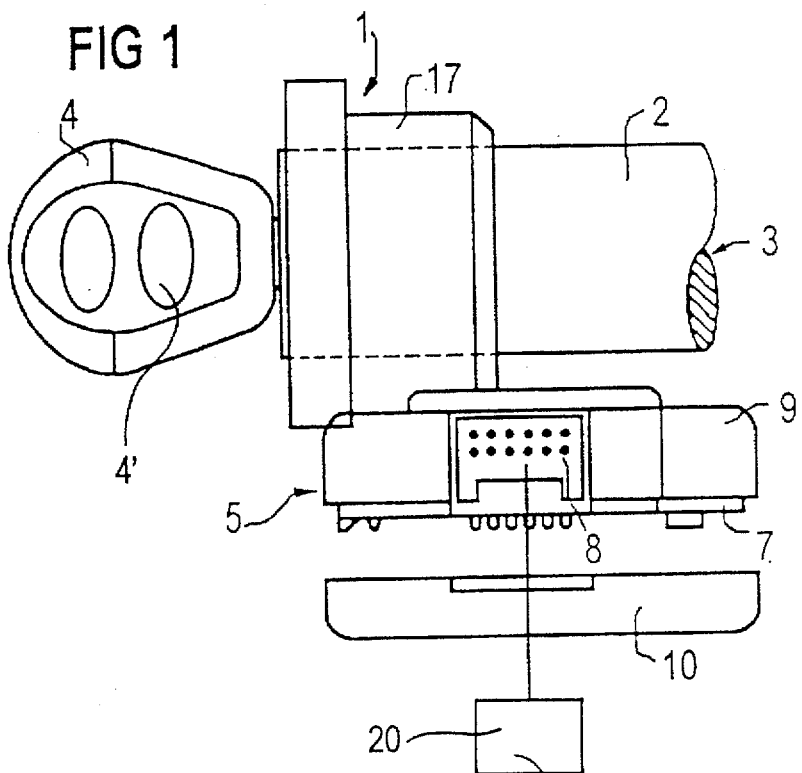
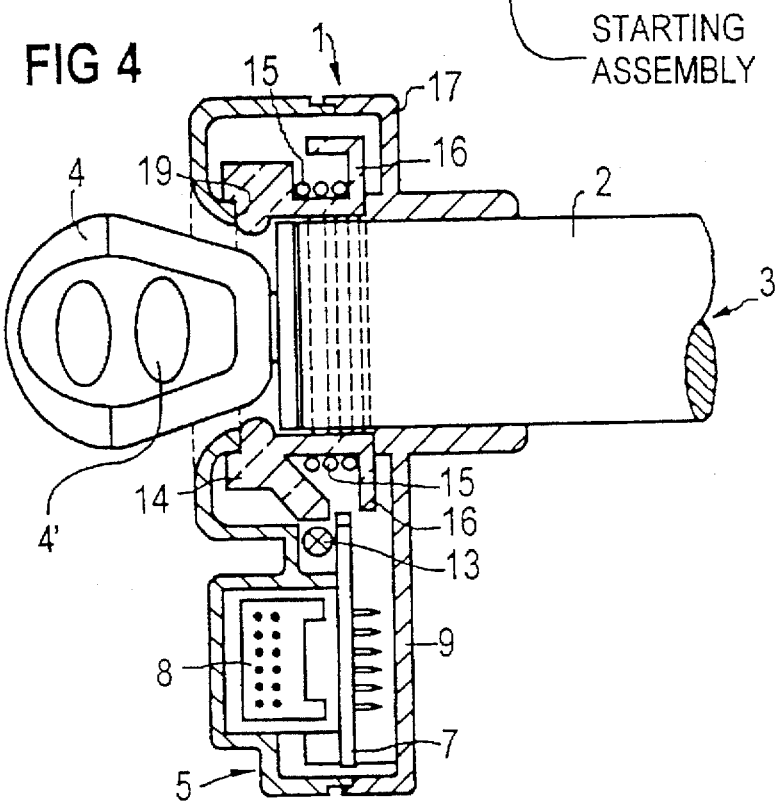

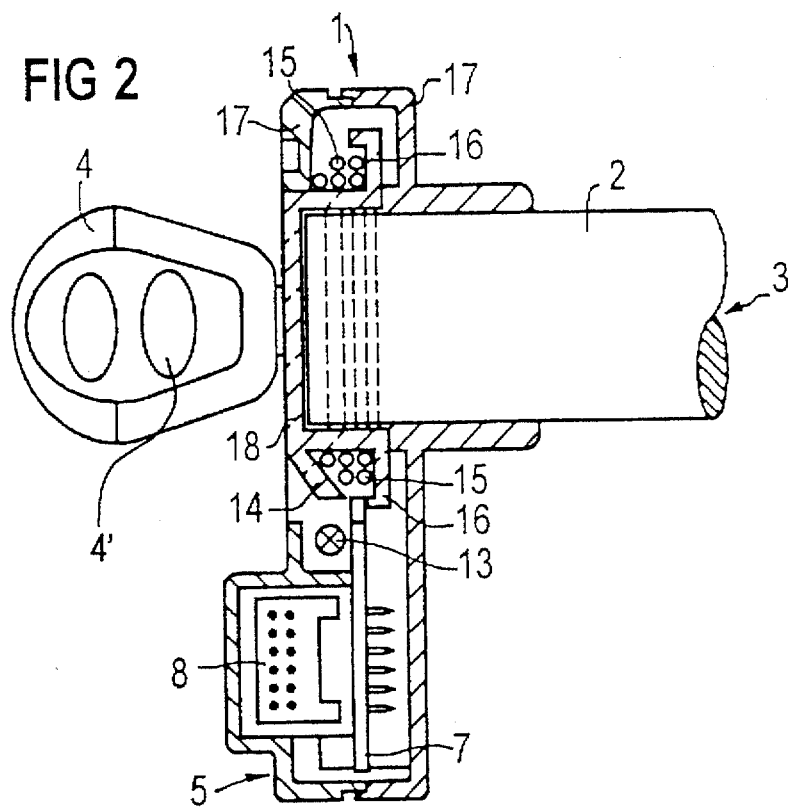
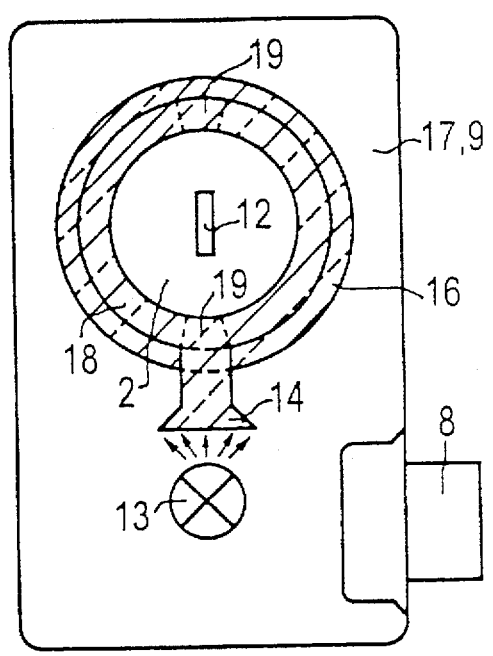

VEHICLE ANTITHEFT DEVICE USING TRANSPONDER AND HAVING ILLUMINATED KEYHOLE

BACKGROUND OF THE INVENTION

Field of the Invention

The invention relates to an anti-theft device for a motor vehicle, in particular an immobilizer.

In an anti-theft device which is known from German Utility Model G 93 14 256 U1, an antenna for an immobilizer is disposed around an ignition lock of a motor vehicle. When an ignition key with a transponder is inserted into the ignition lock, a question signal is sent from the antenna to the transponder, which responds with an answer signal. The answer signal is compared in a control unit with a set-point signal, and if they correspond, an assembly in the motor vehicle is turned on or off. Since the antenna of the immobilizer must be disposed close to the transponder, it is only possible with difficulty to place a lighting device on the ignition key so that the ignition lock can be illuminated.

Summary of the Invention

It is accordingly an object of the invention to provide an anti-theft device for a motor vehicle, which overcomes the hereinafore-mentioned disadvantages of the heretofore-known devices of this general type and in which an antenna is disposed around an ignition lock and the ignition lock is illuminated.

With the foregoing and other objects in view there is provided, in accordance with the invention, an anti-theft device for a motor vehicle, comprising a key having a transponder; a lock having a keyhole for receiving the key; an antenna in the vicinity of the lock; a control unit for controlling the antenna to send starting signals to the transponder and to receive answer signals from the transponder; an assembly being turned on or off if the answer signals correspond to set-point signals; and the antenna having a lighting device being controlled by the control unit for illuminating a region around the keyhole, at least before the key is inserted.

In accordance with another feature of the invention, there is provided a photoconducting coil body, the antenna being an annular coil wound with a plurality of windings onto the photo-conducting coil body.

In accordance with a further feature of the invention, the lighting device includes an annular light source forming a coil body.

In accordance with an added feature of the invention, the lighting device includes a light source and an optical fiber carrying light to the keyhole.

In accordance with an additional feature of the invention, the lighting device includes an optical fiber surrounded by an annular housing having at least one light exit aperture through which light for illuminating the keyhole is shone.

In accordance with yet another feature of the invention, the at least one light exit aperture is disposed annularly around the lock.

In accordance with yet a further feature of the invention, the coil body has an opaque coating preventing the windings of the coil from being visible from outside.

In accordance with a concomitant feature of the invention, the control unit has a housing, and the light source is disposed inside or outside the housing.

Other features which are considered as characteristic for the invention are set forth in the appended claims.

Although the invention is illustrated and described herein as embodied in an anti-theft device for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, side-elevational view of an anti-theft device according to the invention;

FIG. 2 is a fragmentary, sectional view through a housing of the anti-theft device;

FIG. 3 is a partly sectional, front-elevational view of the anti-theft device; and FIG. 4 is a fragmentary, sectional view through a further exemplary embodiment of the anti-theft device.

DESCRIPTION OF THE PREFERRED EMBODIMENTS

Referring now to the figures of the drawings in detail and first, particularly, to FIG. 1 thereof, there is seen an anti-theft device according to the invention, in which an antenna 1 is disposed around a lock cylinder 2 of a lock 3 of a motor vehicle. A user-specific code is stored in memory in a transponder 4' disposed on a key 4. As soon as the key 4 is introduced into the lock 3, a control unit 5 generates a question or start signal, which is transmitted through the antenna 1 to the transponder 4'.

The transponder 4' thereupon responds with a coded answer signal, which is received by the antenna 1, sent onto the control unit 5, and evaluated there. In the control unit 5, the answer signal is compared with a set-point signal, and if the two signals correspond, an assembly 20 in the motor vehicle is turned on or off.

Such an assembly 20 may, for instance, be an engine control unit, an ignition coil, a starter, a shutoff valve, or the like. The assembly 20 serves to enable starting of the engine only if authorization is proved. In such cases, this is referred to as an immobilizer. The lock 3 is then an ignition lock, and the key 4 is an ignition key.

However, the assembly 20 may also be a central locking system by which the vehicle doors are locked or unlocked. Then the lock 3 is a door lock or a trunk lock, and the key 4 is a door key. However, the door key and the ignition key may be identical. Each key 4 has a transponder 4', which automatically has an answer signal for a question signal. Coded, user-specific information is contained in the answer signal.

An electronic circuit is disposed on a printed circuit board 7 in the control unit 5. The control unit 5 is connected to the assembly 20 that is to be controlled and to the vehicle battery through a plug connector 8 and cables connected thereto. The plug connector 8 is disposed in a housing 9 of the control unit 5 that is closed with a cap 10.

The control unit 5 is disposed in the vicinity of the lock 3. The location at which the control unit 5 is disposed in relation to the lock 3 is not essential to the invention. For instance, the control unit 5 may be disposed parallel (as shown in FIG. 1) or perpendicular (as shown in FIG. 2) to the lock 3.

In order to allow the lock 3 to be found easily even in the dark and to make it easy to insert the key 4 into a receptacle of the lock 3, such as a keyhole 12 seen in FIG. 3, the anti-theft device according to the invention has a lighting device.

The lighting device has at least one light source 13, which may be disposed inside or outside the housing 9. If the light source 13 is located outside the housing 9, then the light source 13 can be more easily replaced if it fails. The light is guided through an optical fiber 14 in such a way that the keyhole 12 or the end surface of the lock 3 is illuminated. If the light source 3 is located in the immediate vicinity of the lock 3, then no optical fiber 14 is needed. It is also possible for a plurality of light sources 13 to be disposed around the lock 3. All of the light sources 13 are turned on or off by the control unit 5 or by an external control unit.

The antenna 1 may be constructed as a coil, having a coil wire 15 seen in FIG. 2 that is wound in a plurality of windings onto a coil body 16. The coil is disposed inside a housing ring 17 and annularly surrounds the lock 3. The optical fiber 14 may also be disposed in the interior of the housing ring 17. According to the invention, the optical fiber 14 or the light source 13 is simultaneously constructed as the coil body 16. This saves space, and a separate coil body is not needed. With such a configuration, it is moreover possible to dispose both the antenna 1 and the lighting device as far forward as possible on the lock cylinder, so that the antenna 1 comes close to the transponder 4' in the key 4, and an inductive data transmission with the highest possible field intensity can take place.

Alternatively, the optical fiber 14 can surround the lock 3 annularly as a lighting ring 18, as is shown in FIG. 3. Light can then emerge in either the axial direction (with respect to the axis of the lock cylinder 2) or the radial direction relative to the keyhole 12 (beams of light are represented by arrows in FIG. 3). It is also possible for only one or more than one light exit aperture 19 (represented by dotted lines in FIG. 3) to be present in the housing ring 17, and to be disposed in such a way that the light falls on the keyhole 12 or the end surface of the lock 3, so that the key 4 can be inserted quickly and simply into the keyhole 12. The key 4 itself needs no lighting device.

It is advantageous if the light exit apertures 19 are disposed symmetrically around the axis of the lock cylinder 2, so that the light falls in the direction of the axis.

As is shown in FIG. 4, the housing ring 17 may also protrude past the lock cylinder 2 of the lock 3 and have one or more light exit apertures 19. The optical wave guides 14, into which light is fed through the use of the light source 13, are then located in the light exit apertures 19.

The light exit apertures 19 may be disposed on the end surface of the housing ring 17 in such a way that the light is projected both radially inward and axially forward, or in some direction between them, so that the end surface of the lock 3 and its surroundings are adequately illuminated thereby.

Conventional lamps, LEDs, or functionally equivalent light sources can be used as the light source 13. However, it is essential that enough light strike the end surface of the lock 3 so that the keyhole 12 can be easily found.

If the key 3 is a door lock, then the lighting device can be turned on as soon as the door handle is touched. A capacitive sensor which may be provided for this purpose, outputs a turn-on signal when touched by a hand. The lighting device is turned off as soon as the key 4 is in the lock 3. To that end, a magnetic sensor in the lock 3, for instance, can detect the key bit and emit the turnoff signal.

If the lock 3 is an ignition lock, then the lighting device can be turned on whenever the doors of the motor vehicle are unlocked properly. The unlocking of the doors is reported to the control unit 5 through electrical connections present in the vehicle, and the control unit 5 in turn turns on the lighting device.

It is also possible for the lighting device not to be activated until after a predetermined period of time, with the time period being dimensioned in such a way that the user first has a chance to sit down on the driver's seat. As soon as the key 4 is in the ignition lock or the engine is started, the lighting device can be turned off again.

The housing ring 17 may be constructed as a translucent or transparent material or as an optical fiber. The coil body 16, which after all is part of the lighting device, may have an opaque or nontranslucent outer wall, so that the coil wires 15 of the antenna 1 are not visible. Therefore, a thief or a person breaking in cannot tell right away whether or not there is an anti-theft device present.

It is advantageous if the optical fiber 14 protrudes from the light exit aperture 19 as seen in FIG. 4 and thus illuminates the entire surroundings of the end surface of the lock 3. This makes it easy for the user to find the keyhole 12 in the dark.

It is also advantageous if the coil body 16 is constructed as a light source 13. This saves additional space.

The lighting ring 18 around the lock 3 may be constructed as either an optical fiber 14 or as the light source 13. In both cases, the lighting ring 18 carries the coil wires 15 and is activated through the use of the control unit 5.

We claim:

1. An anti-theft device for a motor vehicle, comprising:
   a key having a transponder;
   a lock having a keyhole for receiving said key;
   an antenna in the vicinity of said lock;
   a control unit for controlling said antenna to send starting signals to said transponder and to receive answer signals from said transponder;
   an assembly being turned on and off if the answer signals correspond to set-point signals;
   said antenna having a lighting device being controlled by said control unit for illuminating a region around said keyhole, at least before said key is inserted; and
   said antenna being formed as an annular coil having a photoconducting coil body wound with a plurality of windings, said photoconducting coil body being simultaneously part of said lighting device.

2. The anti-theft device according to claim 1, wherein said lighting device includes an annular light source forming said coil body.

3. The anti-theft device according to claim 2, wherein said control unit has a housing, and said light source is disposed inside said housing.

4. The anti-theft device according to claim 2, wherein said control unit has a housing, and said light source is disposed outside said housing.

5. The anti-theft device according to claim 1, wherein said lighting device includes a light source and an optical fiber carrying light to said keyhole.

6. The anti-theft device according to claim 1, wherein said lighting device includes an optical fiber surrounded by an annular housing having at least one light exit aperture through which light for illuminating said keyhole is shone.

7. The anti-theft device according to claim 6, wherein said at least one light exit aperture is disposed annularly around said lock.

8. The anti-theft device according to claim 1, wherein said coil body has an opaque coating preventing said windings of said coil from being visible from outside.

* * * * *